(12) United States Patent
de Vries

(10) Patent No.: US 8,912,500 B1
(45) Date of Patent: Dec. 16, 2014

(54) UV RADIATION DETECTOR WITH A REPLACEABLE SECONDARY WINDOW

(75) Inventor: Pieter de Vries, London (CA)

(73) Assignee: UVDynamics Inc., London (CA)

( * ) Notice: Subject to any disclaimer, the term of this patent is extended or adjusted under 35 U.S.C. 154(b) by 70 days.

(21) Appl. No.: 13/486,237

(22) Filed: Jun. 1, 2012

Related U.S. Application Data

(60) Provisional application No. 61/493,537, filed on Jun. 6, 2011.

(51) Int. Cl.
*G01J 1/42* (2006.01)
*G01J 1/02* (2006.01)

(52) U.S. Cl.
CPC .............. *G01J 1/0271* (2013.01); *G01J 1/0252* (2013.01)
USPC ....................................................... 250/372

(58) Field of Classification Search
USPC ........... 250/372; 362/202, 203, 204, 205, 206
See application file for complete search history.

(56) References Cited

U.S. PATENT DOCUMENTS

| 4,668,091 | A |   | 5/1987  | Lagesson |           |
|-----------|---|---|---------|----------|-----------|
| 4,826,316 | A | * | 5/1989  | Odum     | 356/239.7 |
| 5,382,799 | A | * | 1/1995  | May      | 250/372   |
| 5,844,668 | A | * | 12/1998 | Lepain et al. | 356/43 |
| 6,666,856 | B2 |  | 12/2003 | Connors  |           |
| 7,166,831 | B2 |  | 1/2007  | Depue    |           |
| 7,618,414 | B2 |  | 11/2009 | Connors  |           |
| 7,837,675 | B2 |  | 11/2010 | Dover    |           |

OTHER PUBLICATIONS

"MF Series UV Power Source + UV Level Detection", Brochure, 2011, Downloaded & Printed May 24, 2012, http://www.uvdynamics.com/assets_pdf/StandardPowerSource.pdf.

* cited by examiner

*Primary Examiner* — David Porta
*Assistant Examiner* — Edwin Gunberg
(74) *Attorney, Agent, or Firm* — Neustel Law Offices

(57) ABSTRACT

A UV radiation detector with a replaceable secondary window for that is easily replaced by an end user thereby increasing the accuracy of UV radiation measurements. The UV radiation detector with a replaceable secondary window generally includes a housing having a primary window, a UV radiation sensor within the housing to measure UV radiation passing through the primary window, a secondary window protecting the primary window from the fluid and a retainer member having an outer opening removably connectable to the housing to retain the secondary window. The secondary window can be easily replaced after becoming contaminated.

20 Claims, 10 Drawing Sheets

UV RADIATION DETECTOR WITH A REPLACEABLE SECONDARY WINDOW

CROSS REFERENCE TO RELATED APPLICATIONS

I hereby claim benefit under Title 35, United States Code, Section 119(e) of U.S. provisional patent application Ser. No. 61/493,537 filed Jun. 6, 2011. The 61/493,537 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to ultraviolet (UV) radiation detectors and more specifically it relates to a UV radiation detector with replaceable secondary window that is easily replaced by an end user thereby increasing the accuracy of UV radiation measurements.

2. Description of the Related Art

Any discussion of the related art throughout the specification should in no way be considered as an admission that such related art is widely known or forms part of common general knowledge in the field.

Ultraviolet (UV) radiation is utilized for the disinfection of various types of fluids including but not limited to water, drinking water, waste water and air. The disinfection of fluids by UV radiation is sometimes referred to as ultraviolet water disinfection or ultraviolet germicidal irradiation (UVGI). UV radiation may be applied to various systems including but not limited to air circulation systems and water circulation systems in buildings. It is important that the fluid being disinfected is exposed to a sufficient level of UV radiation to ensure that all harmful microorganisms (e.g. pathogens, viruses, molds) are killed. UV radiation detectors are used within a UVGI system to detect the level of UV radiation being applied to the fluid. For example, a dose of 40 mJ/cm2 is recommended by the US EPA and NSF for primary water disinfection. If the level of UV radiation falls below the recommended or minimum level, then there is an increased risk that harmful microorganisms may remain within the fluid and later consumed by an individual. It is therefore important that the UV radiation detector accurately measure the UV radiation exposure of the fluid at all times.

Conventional UV radiation detectors (also known as UV radiation monitor probes) have a primary window that directly contacts the fluid (e.g. air, water) and allows for the entrance of the UV radiation for measurement. The UV radiation detector is positioned within the disinfection or reaction chamber of the disinfection system. The primary window is constructed of a material that is transparent to UV radiation (e.g silica glass, quartz glass or polytetrafluoroethylene (PTFE), sapphire, calcium fluoride, magnesium fluoride). FIG. 1 illustrates a conventional UV radiation detector where the primary window is sealed within a housing by a first seal. FIG. 2 illustrates a conventional UV radiation detector where the primary window is integrally formed within the housing out of a material such as PTFE. The UV radiation detector is positioned within the fluid to detect the level of UV radiation the fluid is exposed to. The UV radiation detector further is in communication via wires or wirelessly with a control unit which may activate an alarm if the UV radiation levels detected fall below a preset limit (e.g. 40 mJ/cm2).

Unfortunately, conventional UV radiation detectors have a single primary window that is prone to contamination from contacting the fluid thereby reducing the amount of UV radiation that is allowed to pass through the primary window to the UV radiation detector. Even though the fluid may be exposed to the desired amount of UV radiation, if the primary window is contaminated, the true level of UV radiation will not be measured by the UV radiation detector and a false alarm may be activated. The user must then either call a maintenance person to clean the primary window or attempt to clean the primary window themselves. Cleaning the primary window due to fouling can be time consuming and requires the user to have the proper cleaning equipment available. In addition, there is a risk that the user inadequately cleans the primary window resulting in reduced pass-through of the UV radiation. Finally, if the contamination cannot be adequately removed from the primary window, the entire UV radiation detector may have to be replaced which is expensive and time consuming.

Because of the inherent problems with the related art, there is a need for a new and improved UV radiation detector with a replaceable secondary window for that is easily replaced by an end user thereby increasing the accuracy of UV radiation measurements.

BRIEF SUMMARY OF THE INVENTION

The invention generally relates to a UV radiation detectors which includes a housing having a primary window, a UV radiation sensor within the housing to measure UV radiation passing through the primary window, a secondary window protecting the primary window from the fluid and a retainer member having an outer opening removably connectable to the housing to retain the secondary window.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
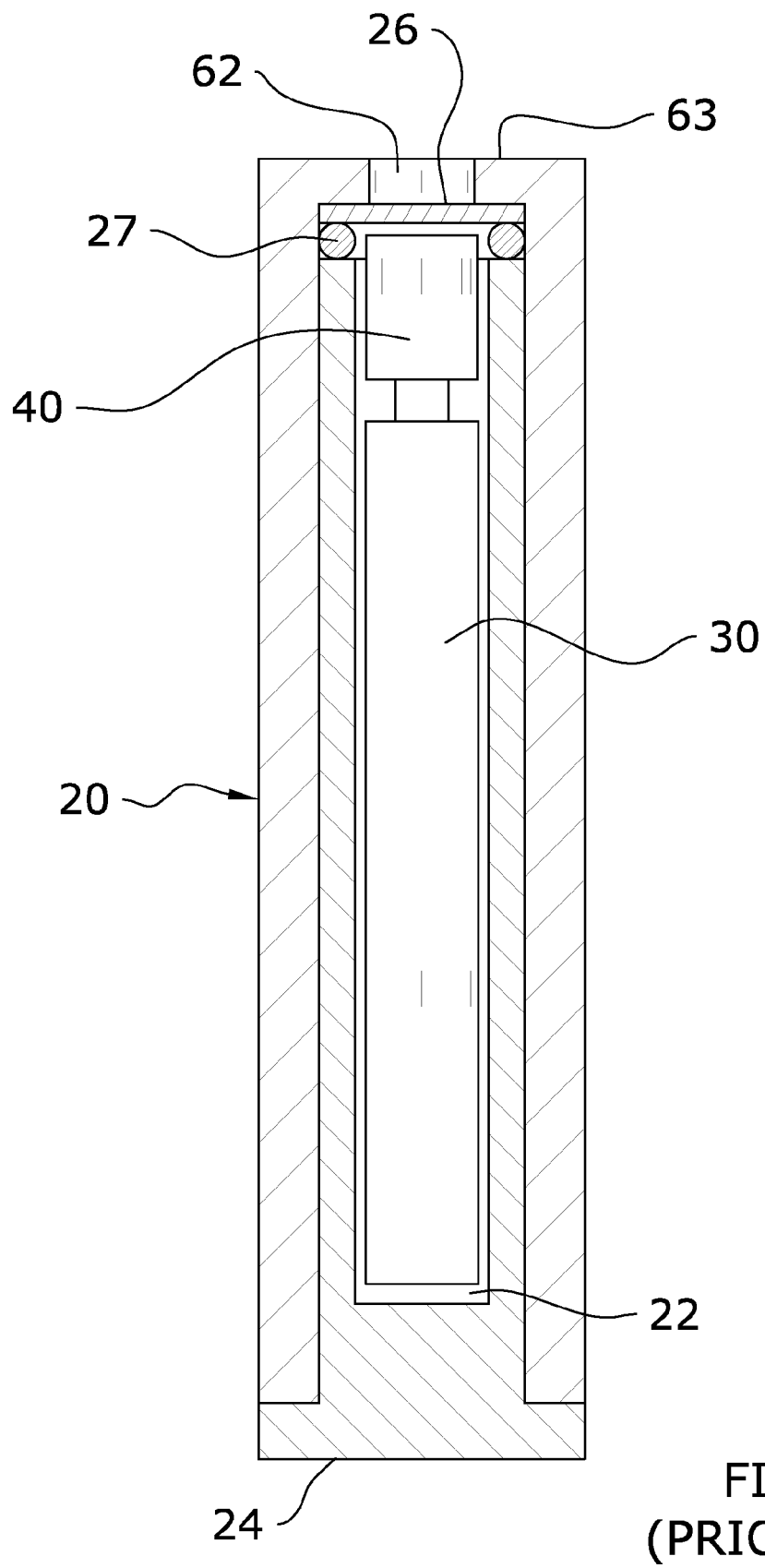
FIG. 1 is a cross sectional view of a prior art UV radiation detector having a sealed primary window wherein the housing is comprised of a material such as stainless steel.
Figure 2:
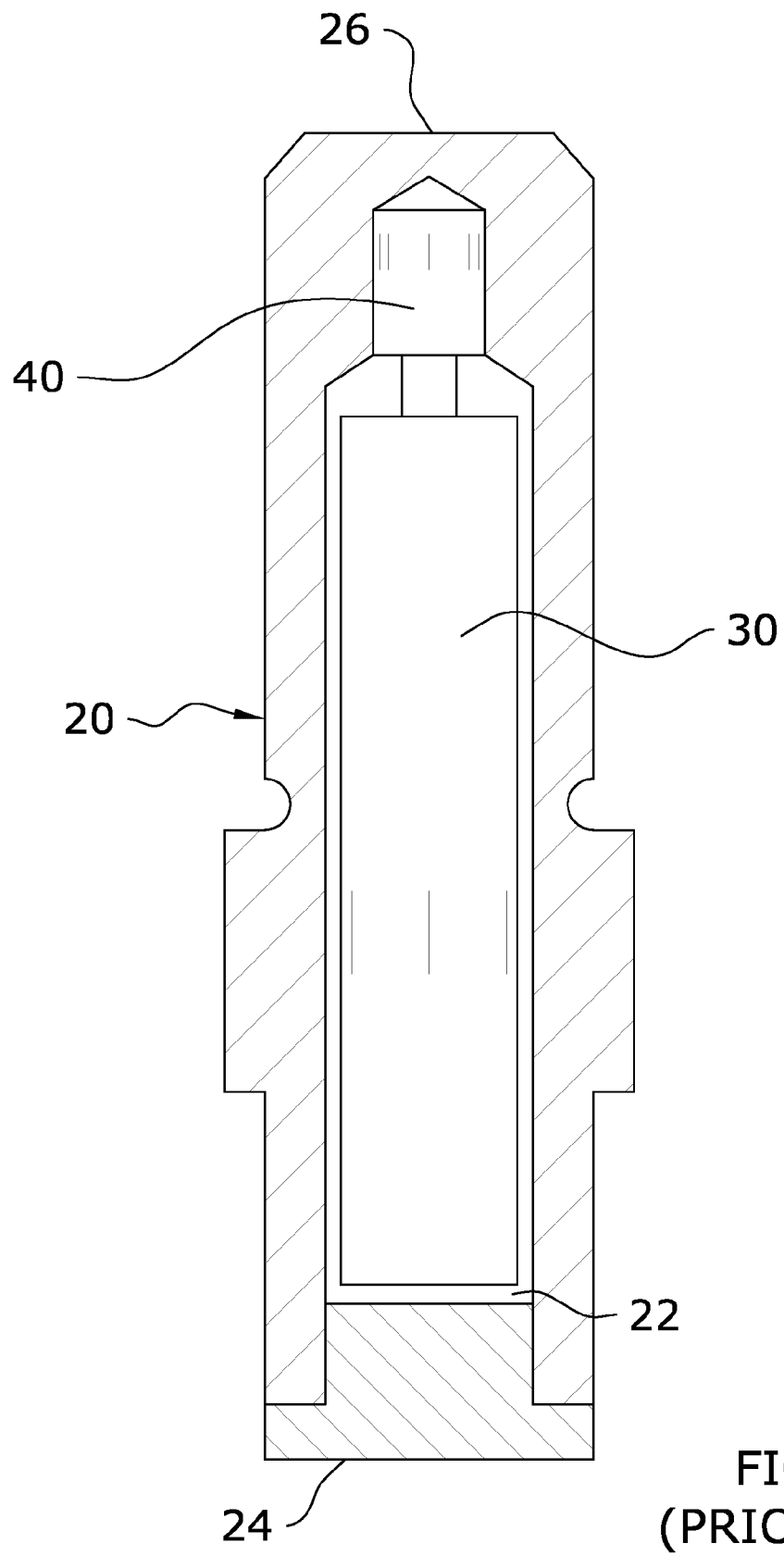
FIG. 2 is a cross sectional view of a prior art UV radiation detector having a primary window integrally formed within the housing wherein the housing and primary window are both comprised of a single piece of polytetrafluoroethylene (PTFE).

Turning now descriptively to the drawings, in which similar reference characters denote similar elements throughout the several views, FIGS. 1 through 10 illustrate a UV radiation detector with a replaceable secondary window 10, which comprises a housing 20 having a primary window 26, a UV radiation sensor 40 within the housing 20 to measure UV radiation passing through the primary window 26, a secondary window 50 protecting the primary window 26 from the fluid and a retainer member 60 having an outer opening 62 removably connectable to the housing 20 to retain the secondary window 50. The present invention is preferably utilized within an ultraviolet (UV) germicidal irradiation system for disinfecting a fluid (e.g. air, water), however, various other applications may also utilize the present invention.

B. Housing

FIGS. 1 through 9 illustrate an exemplary housing 20 suitable for usage within the present invention. The housing 20 may have various shapes and sizes as are commonly utilized for UV radiation detectors in the UV disinfection industry. FIGS. 1 through 9 of the drawings illustrate an elongated tubular structure for the housing 20 with a cavity 22 within. The housing 20 may be constructed of various types of materials that do not allow a substantial portion of UV radiation to pass through (e.g. steel) or that do allow a substantial portion of UV radiation to pass through (e.g. polytetrafluoroethylene (PTFE)).

Figure 8:
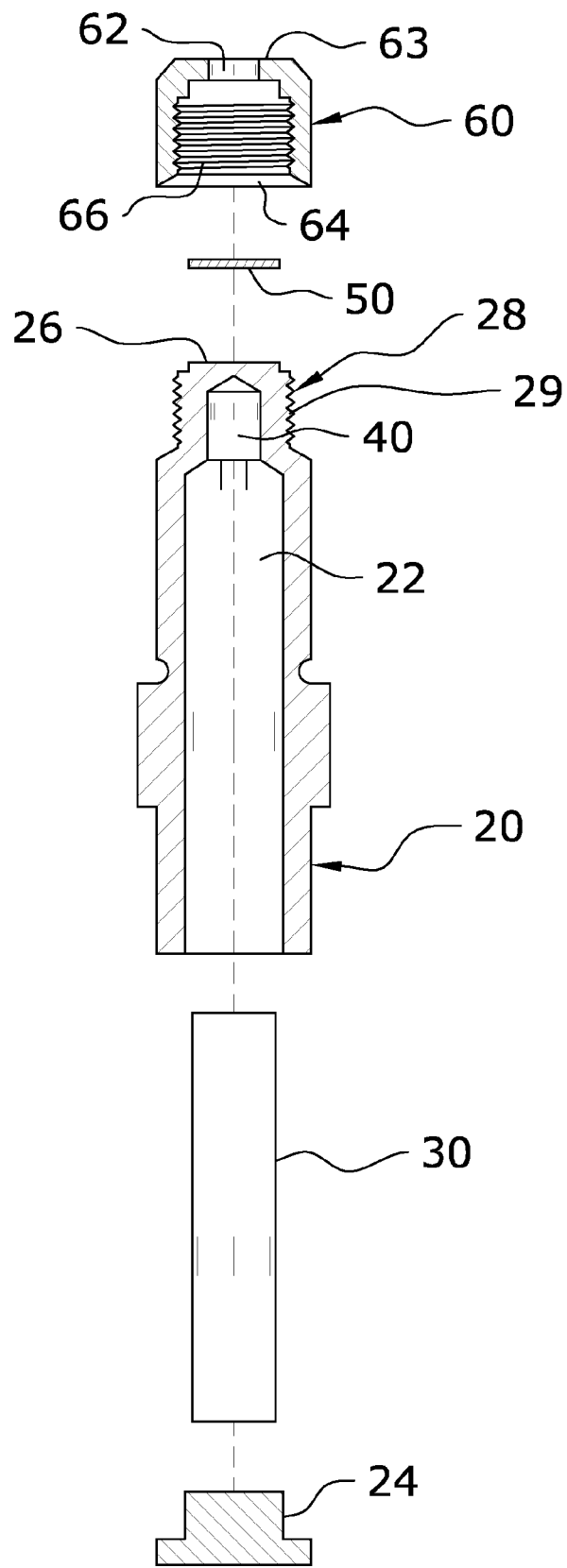
FIG. 8 is an exploded cross sectional view of the present invention.
Figure 9:
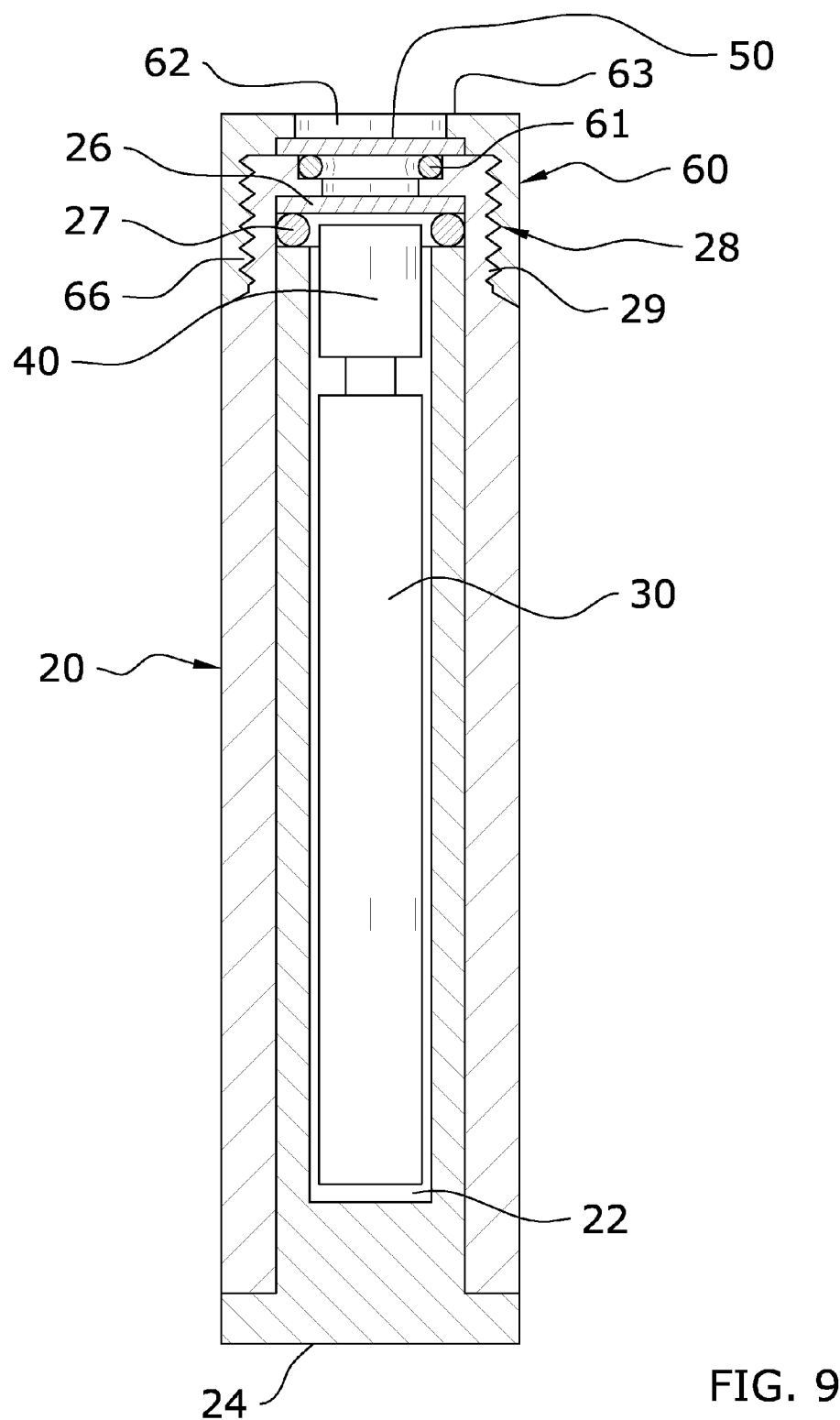
FIG. 9 is an alternative embodiment of the present invention utilizing a seal to prevent fluid from entering between the secondary window and the primary window.
Figure 10:
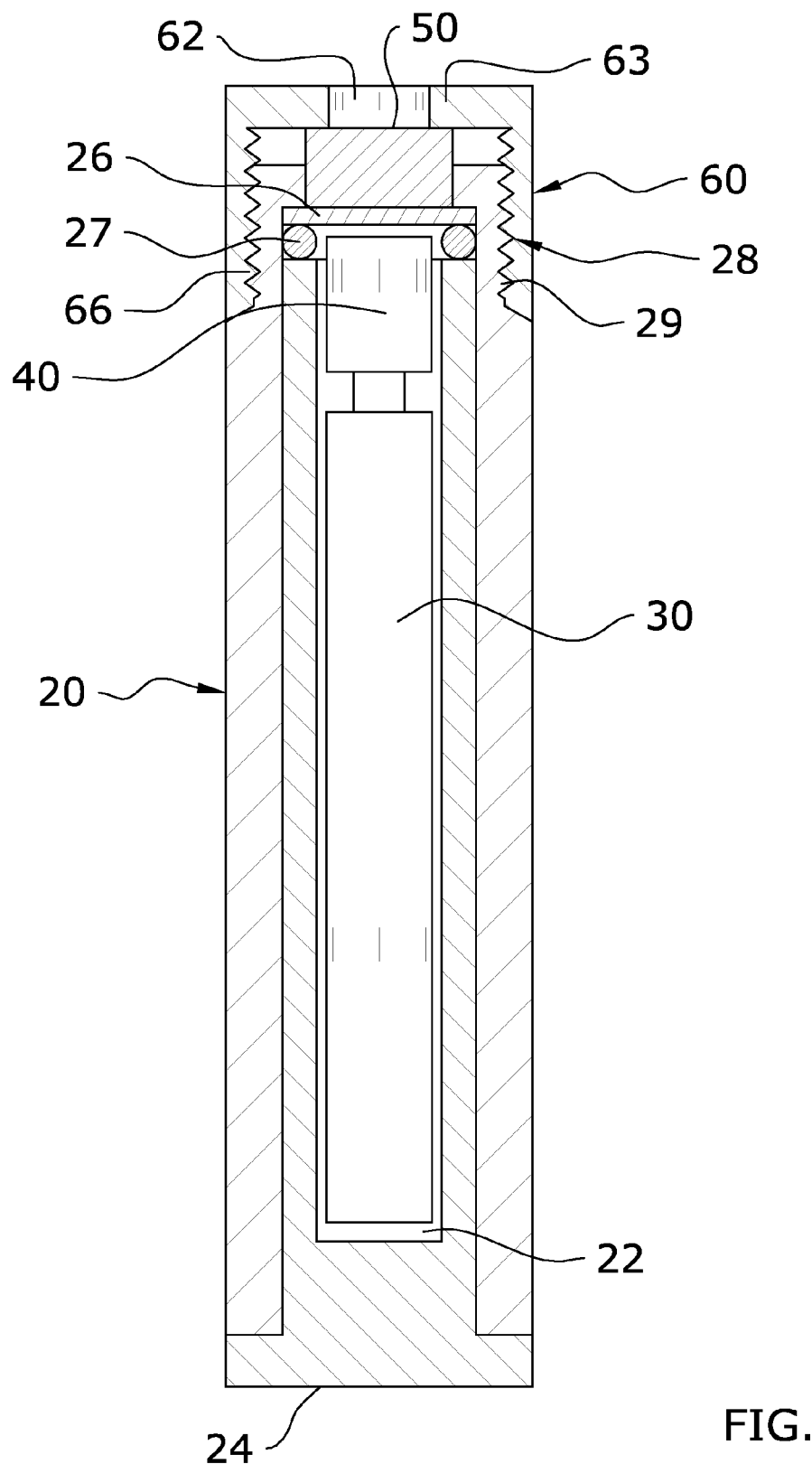
FIG. 10 is a second alternative embodiment of the present invention that does not utilize a seal between the secondary window and the primary window.

The cavity 22 of the housing 20 receives the UV radiation sensor 40 and related electronics commonly utilized within a conventional UV radiation detector. The cavity 22 may be closed at a distal end thereof with an end cap 24 or related structure that seals the cavity 22. The cavity 22 may also include a photo detector interface circuit 30 and a power source electrically connected to the UV radiation sensor 40 as illustrated in FIGS. 8 through 9 of the drawings. A typical application of the present invention involves providing electrical power from a building's electrical system instead of utilizing a battery.

The housing 20 is preferably a sealed structure that may be directly placed within a disinfection chamber that receives the fluid (e.g. air, water) to be disinfected. The housing 20 may be fully or partially positioned within the disinfection chamber. The primary window 26 must have an unobstructed view of the fluid to allow the UV radiation emitted by a UV energy source (e.g. UV lamp) to pass through the primary window 26 to the UV radiation sensor 40.

C. Primary Window

The primary window 26 of the present invention allows for the UV radiation to pass through to the UV radiation sensor 40 for measurement while protecting the UV radiation sensor 40. The primary window 26 is preferably sealed with respect to the housing 20 by a primary seal 27 to prevent the fluid or other debris from entering the cavity 22 of the housing 20. The primary window 26 is preferably comprised of a flat circular shape, however, various other shapes may be utilized.

The primary window 26 may be comprised of various types of materials that allows UV radiation to pass through such as but not limited to silica glass, quartz glass or polytetrafluoroethylene (PTFE), sapphire, calcium fluoride, and magnesium fluoride. A related suitable material for the primary window 26 is "reconstructed glass" and is sold under the trademark VYCOR® by CORNING INCORPORATED which is approximately 96% silica and is manufactured in a multi-step process by first using alkali-borosilicate glass that is melted and formed to a desired shape, followed by heat treating and then soaking in a hot acid solution to leach away the soluble glass phase thereby leaving the end material mostly silica, and finally heated to more than 1,200 degrees Celsius to make the material non-porous.

The primary window 26 may be comprised of a structure that is separate from the housing 20 or integrally formed within the housing 20 from the same material as the housing 20. If the primary window 26 is integrally formed within the housing 20, it is preferable to utilize polytetrafluoroethylene (PTFE) which allows for the passage of UV radiation while retaining substantial structural integrity to form the housing 20. FIGS. 2, 3, 7 and 8 illustrate an example of the primary window 26 being integrally formed with the housing 20 from the same material to form a single unitary structure.

D. UV Radiation Sensor

The UV radiation sensor 40 is positioned within the housing 20 behind the primary window 26 to measure UV radiation that passes through the primary window 26. The UV radiation sensor 40 may be comprised of any sensor that is capable of measuring the UV radiation level within the fluid in real-time (e.g. silicone carbide photo diode, UV enhanced silicone photo diode, a visible light sensitive photo detector with a phosphor conversion coating to enable UV radiation to be converted to visible radiation). The UV radiation sensor 40 is in communication with additional equipment such as displays to display the UV radiation level, control units and alarms to warn the user if the UV radiation level falls below a preset level (e.g. below 40 mJ/cm2).

E. Secondary Window

Figure 3:
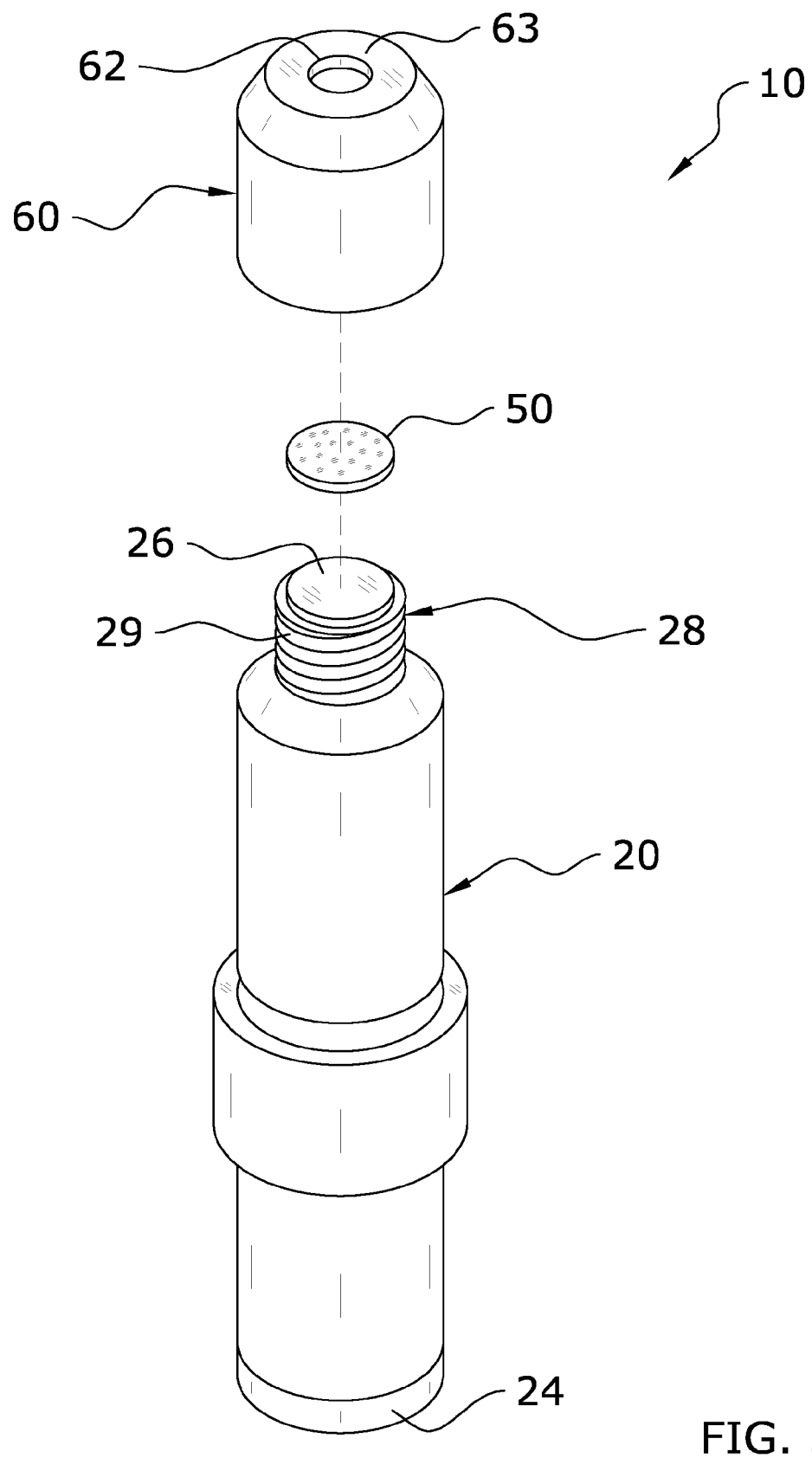
FIG. 3 is an exploded upper perspective view of the present invention.
Figure 4:
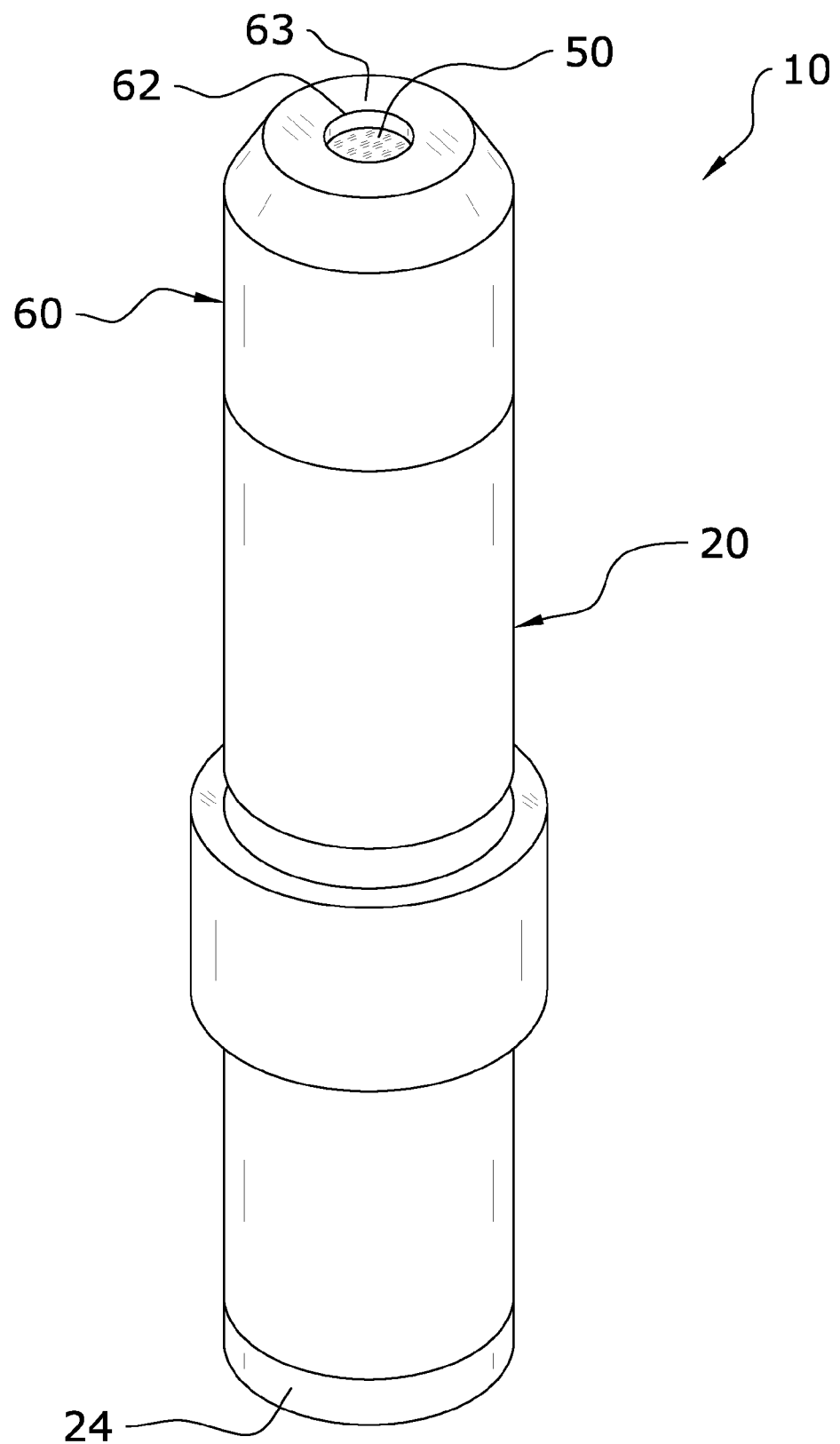
FIG. 4 is an upper perspective view of the present invention.
Figure 5:
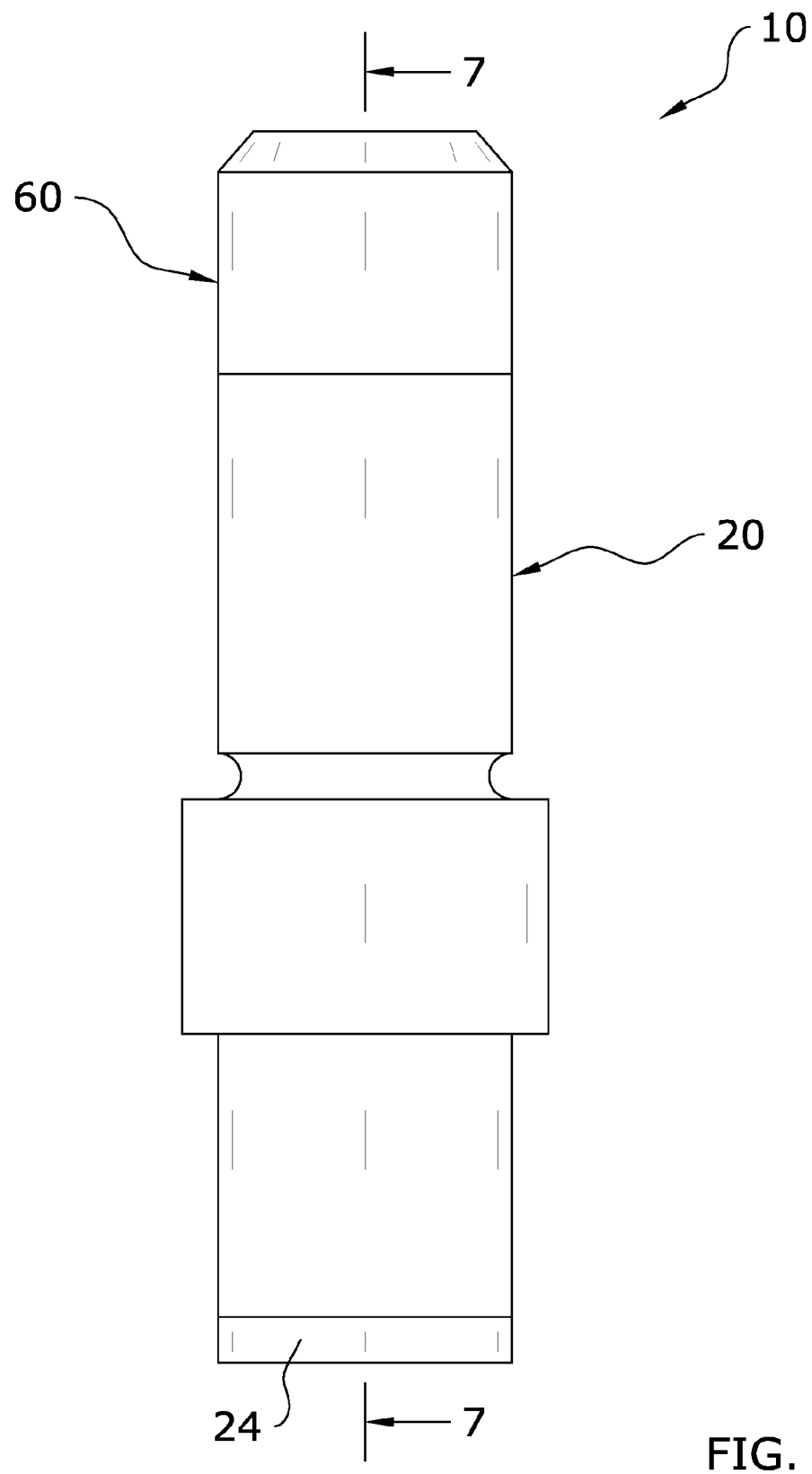
FIG. 5 is a side view of the present invention.

The secondary window 50 is removably attached to the housing 20 for allowing replacement of the secondary window 50 after being contaminated thereby allowing a new uncontaminated secondary window 50 to be positioned over the primary window 26. The secondary window 50 is preferably concentrically aligned with respect to the primary window 26. The secondary window 50 allows for the passage of UV radiation to the primary window 26 and to the UV radiation sensor 40. The secondary window 50 preferably is substantially the same size and shape as the primary window 26 to completely cover the primary window 26. The secondary window 50 is preferably comprised of a flat circular structure as best illustrated in FIG. 3 of the drawings.

Figure 7:
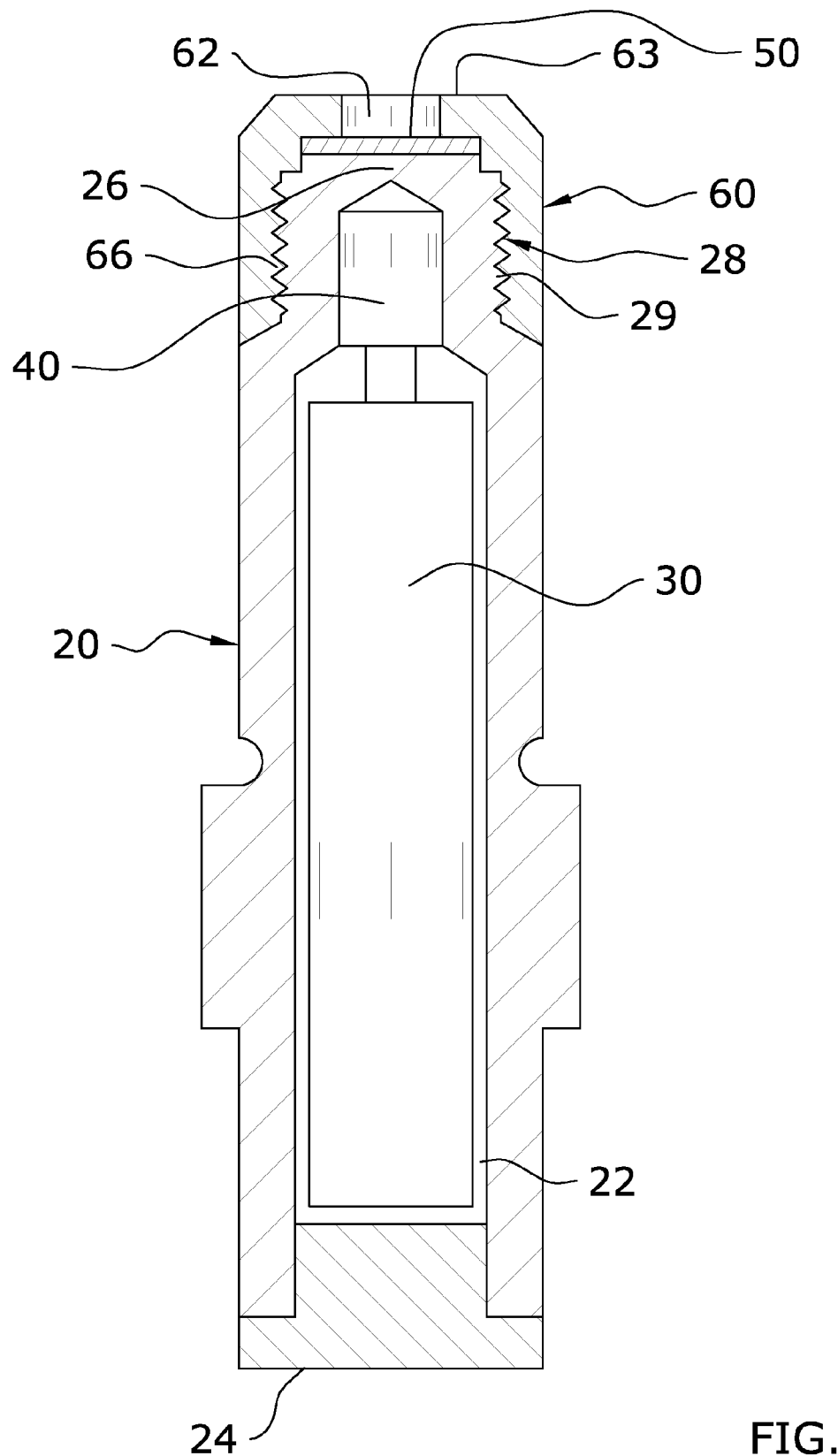
FIG. 7 is a cross sectional view taken along line 7-7 of FIG. 5.

The secondary window 50 is adjacent to and protects an outer surface of the primary window 26 from contamination from the fluid (e.g. air, water) and other debris. When the secondary window 50 becomes contaminated, the secondary window 50 can be cleaned or replaced if cleaning is unable to restore the pass through properties for UV radiation. The secondary window 50 may be juxtaposed to the primary window 26 as illustrated in FIG. 7 of the drawings or spaced a small distance as illustrated in FIG. 9 of the drawings. The inner surface of the secondary window 50 also may directly contact the outer surface of the primary window 26 as further shown in FIG. 7 of the drawings.

When the fluid is a liquid (e.g. water), a secondary seal 61 may be positioned between the secondary window 50 and the primary window 26 to prevent the liquid from passing between the windows 26, 50 as illustrated in FIG. 9 of the drawings. As further shown in FIG. 9 of the drawings, the secondary seal 61 may be positioned between an inner lip of the retainer member 60 and the inner surface of the secondary window 50. A secondary seal 61 may also be utilized if the fluid being measured for UV radiation treatment is a gas (e.g. air). Alternatively, there may not be a secondary seal 61 between the secondary window 50 and the primary window 26 where the fluid passing between the windows 26, 50 is not a significant concern for contamination.

The secondary window 50 may be comprised of various types of materials that allows UV radiation to pass through such as but not limited to silica glass, quartz glass or polytetrafluoroethylene (PTFE), sapphire, calcium fluoride, and magnesium fluoride. A related suitable material for the secondary window 50 is "reconstructed glass" and is sold under the trademark VYCOR® by CORNING INCORPORATED which is approximately 96% silica and is manufactured in a multi-step process by first using alkali-borosilicate glass that is melted and formed to a desired shape, followed by heat treating and then soaking in a hot acid solution to leach away the soluble glass phase thereby leaving the end material mostly silica, and finally heated to more than 1,200 degrees Celsius to make the material non-porous.

F. Retainer Cap

The secondary window 50 may be retained upon the housing 20 and adjacent to the primary window 26 with a retainer member 60 as illustrated in FIGS. 3 through 9 of the drawings. The retainer member 60 has an outer opening 62 and an inner opening 64 to allow for passage of UV radiation through the secondary window 50 and the primary window 26 to the UV radiation sensor 40. The outer opening 62 is concentrically aligned with respect to the secondary window 50 and the primary window 26.

Figure 6:
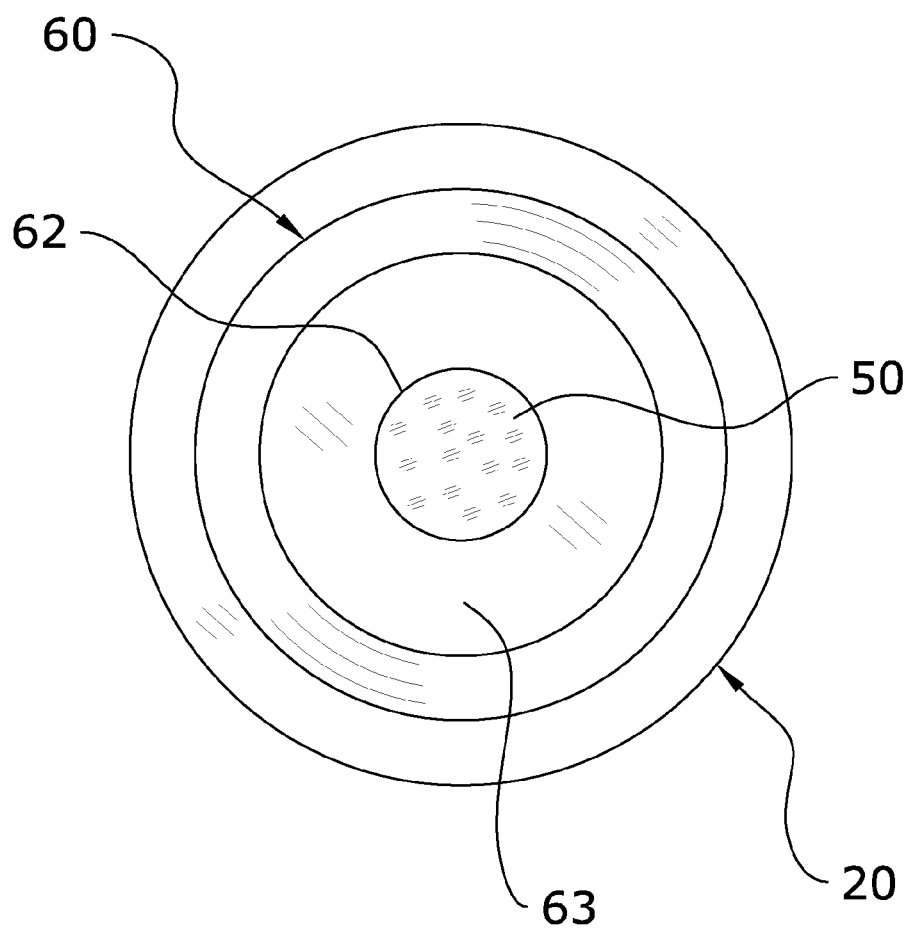
FIG. 6 is an end view of the present invention.

The retainer member 60 is preferably concentrically positioned upon the housing 20 as illustrated in FIGS. 3 and 6 of the drawings. The outer opening 62 and the inner opening 64 of the retainer member 60 are preferably concentrically aligned with the secondary window 50 and the primary window 26 to allow for efficient passage of the UV radiation within the fluid to be accurately measured. The outer opening 62 is preferably smaller in size than the secondary window 50 as shown in FIGS. 6 and 7 of the drawings. The outer opening 62 is defined by the overlapping portion 63 that extends inwardly from the outer perimeter of the retainer member 60 as best illustrated in FIGS. 6 through 9 of the drawings. The outer surface of the secondary window 50 is engaged by the overlapping portion 63 of the retainer member 60 to retain the secondary window 50 upon the housing 20 adjacent to the primary window 26.

The retainer member 60 is removably attached to the housing 20 to removably retain the secondary window 50 adjacent to the primary window 26 thereby allowing replacement of the secondary window 50 if cleaning of the secondary window 50 is insufficient. The retainer member 60 is preferably attached to a connector end 28 of the housing 20, wherein the connector end 28 is received by the inner opening 64 of the retainer.

The retainer member 60 is removably attached by a first coupling 29 attached to the housing 20 and a second coupling 66 attached to the retainer member 60 as illustrated in FIGS. 7 through 9 of the drawings. The first coupling 29 and the second coupling 66 are removably attachable to one another. The first coupling 29 and the second coupling 66 may be comprised of threading as illustrated in FIGS. 7 through 9 of the drawings. The first coupling 29 and the second coupling 66 may also be comprised of a latch structure, snap structure, friction fit structure, bayonet mechanism or other structure that allows for the removable attachment of the retainer member 60 to the housing 20.

G. Operation of Preferred Embodiment

In use, assembled UV radiation detector with a replaceable secondary window 50 10 is positioned within a disinfecting chamber of a disinfecting system and electrically connected to the disinfecting system. The secondary window 50 is in direct contact with the fluid being disinfected. The UV energy supply is activated to supply UV radiation to the fluid (e.g. air, water) within the disinfecting chamber.

A portion of the UV radiation passes through the outer opening 62 of the retainer member 60 then through the secondary window 50 and then through the primary window 26 where the UV radiation sensor 40 measures the level of UV radiation that is being applied to the fluid. The control unit of the disinfecting system utilizes the UV radiation level data from the UV radiation sensor 40 to determine if an adequate level of UV radiation is being applied to the fluid and if an adequate level of UV radiation is not being applied the control unit will activate an alarm (e.g. light, sound, communication) to warn the user that the level of UV radiation has fallen below a threshold.

Two scenarios typically exist when an alarm is activated: the UV radiation level within the disinfecting chamber has fallen below the threshold level or the secondary window 50 has become contaminated (fouled) thereby reducing the amount of UV radiation allowed to enter. The user is able to inspect the present invention and may attempt to clean the secondary window 50 from contamination applied by the fluid over time. If the user determines that the secondary window 50 cannot be cleaned sufficiently, the user is able to replace the secondary window 50 by removing the retainer member 60, removing the fouled secondary window 50, inserting a new secondary window 50 and reattaching the retainer member 60.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A UV radiation detector, comprising:
   a housing having a connector end and a primary window, wherein said primary window allows for the passage of UV radiation and wherein said connector end is comprised of a male threaded end;
   a UV radiation sensor within said housing to measure UV radiation that passes through said primary window;
   a secondary window removably attached to said housing for allowing replacement of said secondary window, wherein said secondary window allows for the passage of UV radiation, wherein said secondary window is adjacent to and protects an outer surface of said primary window from contamination; and
   a retainer member having an outer opening to allow for passage of UV radiation, wherein said retainer member is removably attached to said housing to removably retain said secondary window adjacent to said primary window, wherein said retainer member includes a female threaded end threadably connected to said male threaded end and an overlapping portion, wherein said overlapping portion is opposite of said female threaded end, wherein said overlapping portion extends inwardly to said outer opening thereby defining a perimeter of said outer opening, wherein said outer opening is smaller than said secondary window, wherein said secondary window is in contact with an interior surface of said overlapping portion and wherein said overlapping portion retains said secondary window adjacent to an outer surface of said primary window.

2. The UV radiation detector of claim 1, wherein said secondary window is juxtaposed to said primary window.

3. The UV radiation detector of claim 1, wherein an inner surface of said secondary window contacts said outer surface of primary window.

4. The UV radiation detector of claim 1, wherein said secondary window is comprised of a quartz material.

5. The UV radiation detector of claim 1, wherein said secondary window is concentrically aligned with respect to said primary window.

6. The UV radiation detector of claim 1, wherein said outer opening is concentrically aligned with respect to said secondary window and said primary window.

7. The UV radiation detector of claim 1, including a secondary seal positioned between said secondary window and said primary window.

8. A UV radiation detector, comprising:
   a housing having a connector end and a primary window, wherein said primary window is integrally formed within said housing and wherein said primary window allows for the passage of UV radiation and wherein said connector end is comprised of a male threaded end;
   a UV radiation sensor within said housing to measure UV radiation that passes through said primary window; and
   a secondary window removably attached to said housing for allowing replacement of said secondary window, wherein said secondary window allows for the passage of UV radiation, wherein said secondary window is adjacent to and protects an outer surface of said primary window from contamination;
   a retainer member having an outer opening to allow for passage of UV radiation, wherein said retainer member is removably attached to said housing to removably retain said secondary window adjacent to said primary window, wherein said retainer member includes a female threaded end threadably connected to said male threaded end and an overlapping portion, wherein said overlapping portion is opposite of said female threaded end, wherein said overlapping portion extends inwardly to said outer opening thereby defining a perimeter of said outer opening, wherein said outer opening is smaller than said secondary window, wherein said secondary window is in contact with an interior surface of said overlapping portion and wherein said overlapping portion retains said secondary window adjacent to said outer surface of said primary window.

9. The UV radiation detector of claim 8, wherein said secondary window is juxtaposed to said primary window.

10. The UV radiation detector of claim 8, wherein an inner surface of said secondary window contacts said outer surface of primary window.

11. The UV radiation detector of claim 8, wherein said secondary window is comprised of a quartz material.

12. The UV radiation detector of claim 8, wherein said secondary window is concentrically aligned with respect to said primary window.

13. The UV radiation detector of claim 8, wherein said outer opening is concentrically aligned with respect to said secondary window and said primary window.

14. The UV radiation detector of claim 1, wherein said primary window and said secondary window are each comprised of the same shape and diameter.

15. A UV radiation detector, comprising:
   a housing having a primary window, wherein said primary window allows for the passage of UV radiation;
   a UV radiation sensor within said housing to measure UV radiation that passes through said primary window;
   a secondary window removably attached to said housing for allowing replacement of said secondary window, wherein said secondary window allows for the passage of UV radiation, wherein said secondary window protects an outer surface of said primary window from contamination; and
   a retainer member having an outer opening to allow for passage of UV radiation, wherein said retainer member is removably attached to said housing to removably retain said secondary window adjacent to said primary window.

16. The UV radiation detector of claim 15, wherein said secondary window is adjacent to said primary window.

17. The UV radiation detector of claim 15, wherein an inner surface of said secondary window contacts said outer surface of primary window.

18. The UV radiation detector of claim 15, wherein said secondary window is concentrically aligned with respect to said primary window.

19. The UV radiation detector of claim 15, including a secondary seal positioned between said secondary window and said primary window.

20. The UV radiation detector of claim 15, wherein said primary window is integrally formed within said housing.

* * * * *